(12) United States Patent
Hayslett et al.

(10) Patent No.: US 9,764,796 B2
(45) Date of Patent: Sep. 19, 2017

(54) ELECTRIC BIKE OPTICAL SHIFT DETECTION AND CONTROL

(71) Applicant: GM Global Technology Operations LLC, Detroit, MI (US)

(72) Inventors: Steven L. Hayslett, Troy, MI (US); Jeffrey W. Yambor, Clawson, MI (US)

(73) Assignee: GM Global Technology Operations LLC, Detroit, MI (US)

(*) Notice: Subject to any disclaimer, the term of this patent is extended or adjusted under 35 U.S.C. 154(b) by 187 days.

(21) Appl. No.: 14/662,995

(22) Filed: Mar. 19, 2015

(65) Prior Publication Data

US 2016/0272277 A1 Sep. 22, 2016

(51) Int. Cl.

| | |
|---|---|
| *B62M 6/50* | (2010.01) |
| *B62M 25/02* | (2006.01) |
| *B60W 30/19* | (2012.01) |
| *B60W 10/08* | (2006.01) |
| *G01B 11/00* | (2006.01) |
| *B60W 30/18* | (2012.01) |
| *B60W 10/11* | (2012.01) |
| *B60W 10/18* | (2012.01) |
| *B62M 6/80* | (2010.01) |

(52) U.S. Cl.
CPC .............. *B62M 6/50* (2013.01); *B60W 10/08* (2013.01); *B60W 10/11* (2013.01); *B60W 10/18* (2013.01); *B60W 30/18127* (2013.01); *B60W 30/19* (2013.01); *B62M 6/80* (2013.01); *B62M 25/02* (2013.01); *G01B 11/00* (2013.01); *B60W 2300/36* (2013.01); *B60W 2420/40* (2013.01); *B60W 2710/081* (2013.01); *Y02T 10/7258* (2013.01)

(58) Field of Classification Search
CPC .............................. B62M 6/40; B62M 25/02
See application file for complete search history.

(56) References Cited

U.S. PATENT DOCUMENTS

| | | | | |
|---|---|---|---|---|
| 4,815,850 A | * | 3/1989 | Kanayama | ............ G03F 9/7049 356/488 |
| 6,320,336 B1 | * | 11/2001 | Eguchi | ..................... B62M 6/45 180/206.2 |
| 6,446,745 B1 | * | 9/2002 | Lee | .......................... B60L 1/14 180/206.2 |
| 2003/0064840 A1 | * | 4/2003 | Kawakami | ............... B62M 9/04 474/70 |

(Continued)

FOREIGN PATENT DOCUMENTS

| | | |
|---|---|---|
| BR | 102016005755 A2 | 9/2016 |
| CN | 105987713 A | 10/2016 |
| DE | 102016104727 A1 | 9/2016 |

OTHER PUBLICATIONS

Garry Barkovic and Ehud Shafir, Optical Methods for Distance and Displacement Measurments, Advances in Optics and Photonics 4, 441-471, published Sep. 11, 2012.*

(Continued)

*Primary Examiner* — Jacob S Scott
(74) *Attorney, Agent, or Firm* — BrooksGroup

(57) ABSTRACT

A number of variations may include a cable movement detector for determining a movement of a cable. A light source may be directed at the cable. A light detector may receive a reflection of the light source from the cable.

14 Claims, 2 Drawing Sheets

(56) References Cited

U.S. PATENT DOCUMENTS

| | | | | |
|---|---|---|---|---|
| 2004/0084238 | A1* | 5/2004 | Yokotani | B62J 99/00 |
| | | | | 180/206.2 |
| 2005/0043920 | A1* | 2/2005 | Castiglioni | D07B 7/02 |
| | | | | 702/183 |
| 2007/0229843 | A1* | 10/2007 | Sesko | G01B 9/02081 |
| | | | | 356/493 |
| 2009/0141263 | A1* | 6/2009 | Cronin | A61B 18/1815 |
| | | | | 356/27 |
| 2012/0241264 | A1* | 9/2012 | Hosaka | B60L 7/14 |
| | | | | 188/156 |
| 2012/0250031 | A1* | 10/2012 | Ikeda | G01D 5/38 |
| | | | | 356/499 |
| 2013/0010305 | A1* | 1/2013 | Oyama | B60T 17/221 |
| | | | | 356/499 |
| 2013/0179016 | A1* | 7/2013 | Gale | B60L 11/007 |
| | | | | 701/22 |
| 2014/0345381 | A1* | 11/2014 | Cronin | G01P 3/54 |
| | | | | 73/514.39 |
| 2016/0272277 | A1 | 9/2016 | Hayslett et al. | |

OTHER PUBLICATIONS

Olympus Microscopy Resource Center/ Introduction to CMOS Image Sensors; http://www. olympusmicro.com/primer/digitalimaging/cmosdimagesensors.html ; 8 pages ; copyright 2012 Olympus America Inc.

Canadian Office Action dated Jan. 11, 2017 ; Application No. 2,922,843 ; Applicant: GM Global Technology Operations LLC; 2 pages.

\* cited by examiner

ELECTRIC BIKE OPTICAL SHIFT DETECTION AND CONTROL

TECHNICAL FIELD

The field to which the disclosure generally relates includes electric cycles and more specifically, the field includes cable movement detection in electric cycles.

BACKGROUND

A cycle may use both variable gear devices and brakes that are operated by cables. One variable gear device is a derailleur gear system that provides a variable ratio transmission. Derailleurs typically include a chain guide moved through a lever or twist grip shifter operated cable. A change in lever position moves the chain guide to direct the chain between gears or sprockets. Another variable gear device is an internal gear hub that may employ planetary or other gear types. Again, shifting between gears is accomplished by a manually operated device connected to the hub by a cable. An electric cycle may employ a power unit that supplements the manual torque input from the operator. In an electric cycle smooth shifting and regenerative braking is desired.

SUMMARY OF ILLUSTRATIVE VARIATIONS

A number of illustrative variations may include a cable movement detector for determining a movement of a cable. A light source may be directed at the cable. A light detector may receive a reflection of the light source from the cable.

A number of other illustrative variations may include a product for use with an electric cycle. A cable may be connected in the electric cycle. The cable may control an operating function of the electric cycle. A cable movement detector may be positioned proximate the cable. Movement of the cable may be detected by the cable movement detector, which may generate a signal from the movement. The signal may be used to affect the operating function.

Additional illustrative variations may include a method of operating an electric cycle. The electric cycle may include a motor-generator unit for propelling the electric cycle, a variable gear unit connected with a shift lever through a first cable, and a brake connected with a brake lever through a second cable. A cable movement detector may be provided in proximity to at least one of the first and second cables. An amount of movement of at least one of the first and second cables may be determined. The motor-generator unit may be controlled in response to the amount of movement.

Other illustrative variations within the scope of the invention will become apparent from the detailed description provided herein. It should be understood that the detailed description and specific examples, while disclosing variations within the scope of the invention, are intended for purposes of illustration only and are not intended to limit the scope of the invention.

BRIEF DESCRIPTION OF THE DRAWINGS

Select examples of variations within the scope of the invention will become more fully understood from the detailed description and the accompanying drawings, wherein.

DETAILED DESCRIPTION OF ILLUSTRATIVE VARIATIONS

The following description of the variations is merely illustrative in nature and is in no way intended to limit the scope of the invention, its application, or uses.

Figure 1:
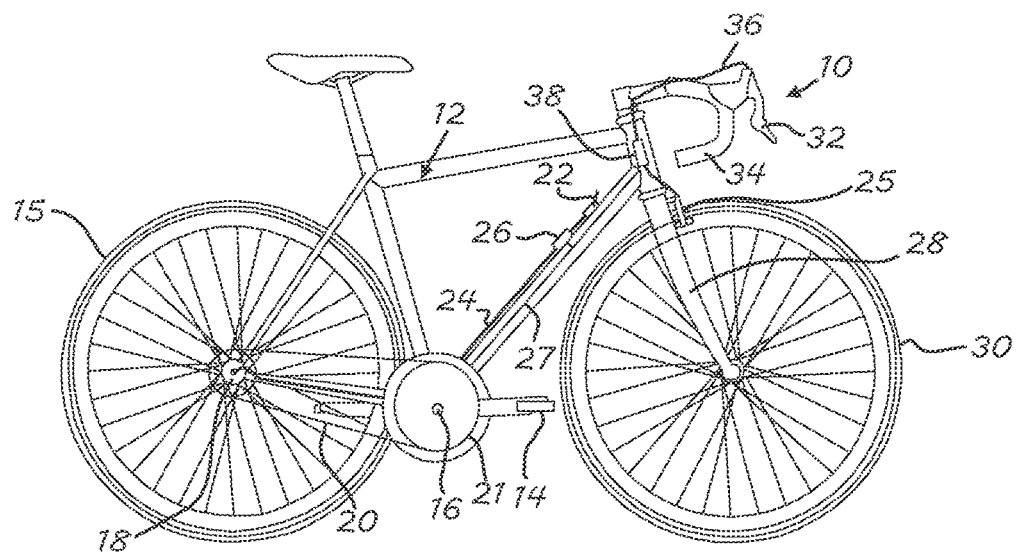
FIG. 1 is a schematic illustration of a cycle according to a number of variations.

A number of variations may be described with reference to FIG. 1 which illustrates an electric cycle 10. The electric cycle 10 may be a bicycle, tricycle, or four-wheel electric cycle having a crank assembly 14 constructed and arranged to allow a rider to provide input thereto. The crank assembly 14 may be engaged with the rear wheel 15 through a linking element such as a chain 20. The electric cycle 10 may include an electric motor-generator unit 16 which may be used to propel the electric cycle 10 through the chain 20 and to generate electricity from motor braking. In any of a number of variations, the electric motor-generator 16 may be powered by any of a number of batteries (represented in FIG. 4). The motor-generator unit 16 may be attached to the cycle frame 12.

In one variation, the cycle 10 may include a variable gear device 18 located at the hub of the rear wheel 20 or at the front chain ring 21. The variable gear device 18 may be a derailleur or an internal hub or another type of gear device. The variable gear device 18 may be connected to a shift lever 22 through a cable 24. Parts of the cable 24 may pass through a tubular housing for protection. The shift lever 22 may be operated to translate the cable 24 and shift gears in the variable gear device 18. A cable movement detector 26, which may be an optical detection device may be connected to the frame 12 and may be positioned proximate the cable 24. During a gear shift event, the cable movement detector 26 may detect movement of the cable 24 and may discern the relative amount of movement. The cable movement detector 26 may be linked with the motor-generator unit 16, which may be accomplished through a conductor bundle 27, or through a wireless device.

In another variation, the cycle 10 may include a brake caliper 25 positioned on the fork 28, and which may be constructed and arranged to engage the front wheel 30, or alternatively the rear wheel 15, or both. A lever 32 may be provided on the handlebar 34 and may be connected to the brake caliper 25 through a cable 36. Parts of the cable 36 may be protected by a tubular housing. A similar brake may be provided for the rear wheel 15. Optionally, a disc brake system may be used at the hub of the front wheel 30 and rear wheel 15. A cable movement detector 38, which may be an optical detection device, may be connected to the frame 12 and may be positioned proximate the cable 36. During a braking event, the cable movement detector 38 may detect movement of the cable 36 and may discern the relative amount of movement. The cable movement detector 38 may be linked with the motor-generator unit 16, which may be accomplished through a conductor bundle 27, or through a wireless device.

Figure 2:
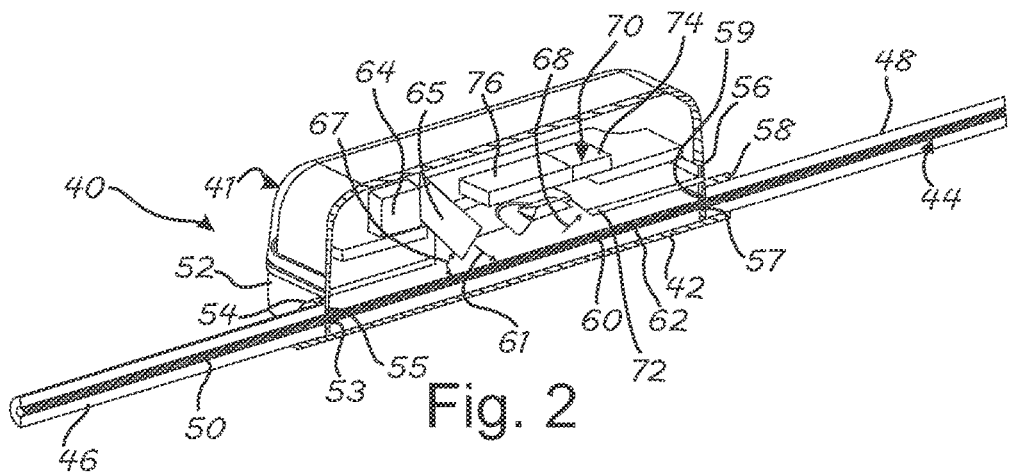
FIG. 2 is a schematic illustration of an optical detector according to a number of variations.
Figure 3:
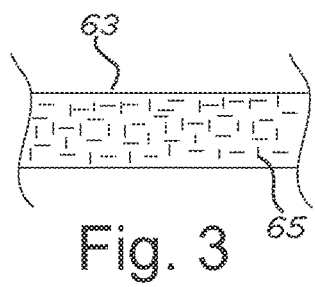
FIG. 3 is a fragmentary illustration of a cable for use with an optical detector according to a number of variations.

The cable movement detectors 26 and 38 may be of a type further described with reference to FIG. 2 which illustrates a cable movement detector 40. The cable movement detector 40 may be mounted over an open part of the cable 50. The cable movement detector 40 may include a housing 41 with a base 42 that may be adapted to be connected to a cable assembly 44. The cable assembly 44 may include tubular housing segments 46 and 48 through which a cable 50 may extend. The base 42 may include an end 52 that may include an opening 53 surrounded by an annular flange 54. The cable 50 may extend through the opening 53. The cable housing segment 46 may have an end 55 seated inside the flange 54. Similarly, the base 42 may include an end 56 that may include an opening 57 surrounded by an annular flange 58. The cable 50 may extend through the opening 57. The cable housing segment 48 may have an end 59 seated inside the flange 58. As a result, a bare segment 60 of the cable 50 extends through the housing 41. The cable 50 may be made of a material suitable for effecting translation of devices such as brakes and variable gear units under tension. A feature of the cable 50 may be a non-smooth surface that facilitates detection to sense motion. The cable 50 may have a feature such as a repeating consistent pattern 62 on its outer surface. The pattern 62 may be imprinted or may be formed as a result of construction such as by joining a plurality of twisted or braided strands to form the cable 50. Alternatively, a cable 63 may be provided with a randomly textured surface pattern 65 as shown in FIG. 3 as the feature that the cable movement detector 38 senses. A random pattern may be preferred in some applications.

The cable detection device 40 may include a light source 64 that may be a light emitting diode (LED), or another suitable source that preferably exhibits low power consumption and relative brightness. The light source 64 may include a light beam 61 directed at the segment 60 of the cable 50 either directly or through an optical directing device 65 such as a prism. The optical directing device may direct and focus the light beam 61 emitted by the light source 64 toward the cable 50 at an acute angle 67. The angle 67 may be measured between the direction that the optical directing device 65 is oriented and the cable 50. At least part of the light beam 61 as represented by the arrow 68 may reflect off the cable 50. In the event of a translation of the cable 50, the characteristics of the reflecting light 68 may vary as the pattern 62 passes through the light beam 61 directed on the cable 50 from the light source 64. The reflected light 68 may be directed onto a light detector 70 either directly or through an optical device 72 that may focus or project the reflected light 68 onto the light detector 70.

The light detector 70 may include a sensor 74 such as an array of photo diodes or an image sensor such as a complementary metal-oxide semiconductor (CMOS). The sensor 74 may detect movement as the reflected light 68 varies as a result of movement of the pattern 62 on the cable 50 within the light beam 61. The sensor 74 may communicate with a digital signal processor 76 (DSP) for analysis of the image data. The DSP interprets the detected pattern 62 in the images it receives and discerns how the cable 50 has moved in successive images. Based on the change in the pattern over a sequence of images, the DSP determines the distance that the cable 50 has moved.

Figure 4:
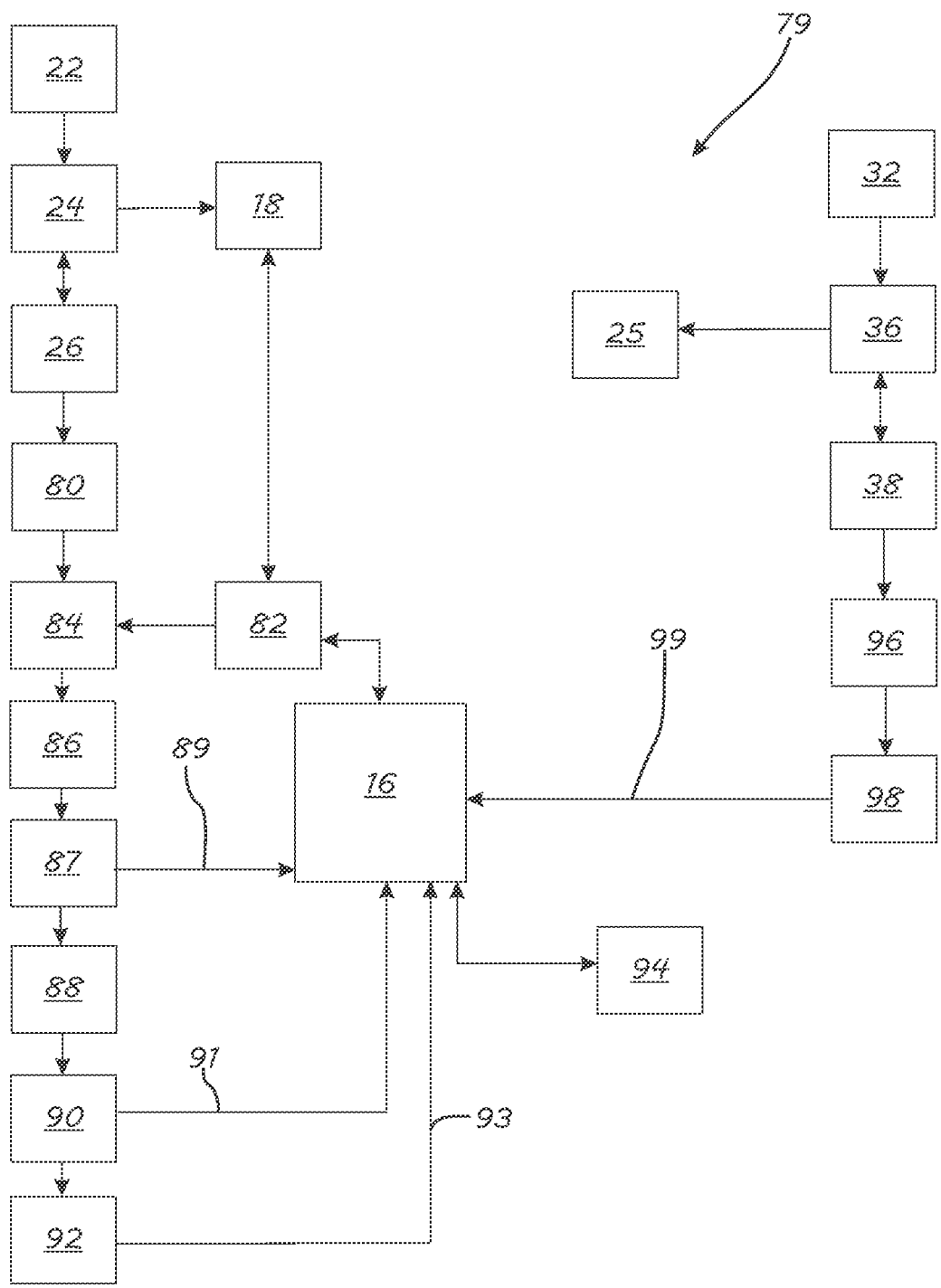
FIG. 4 is a block diagram of electric bike cable movement detection and control system according to a number of variations.

Referring to FIG. 4, a number of variations for use of the cable movement detector 40 may be described in relation to the cable movement detection and control system 79. The system 79 may be used with an electric cycle such as electric cycle 10 and corresponding reference numerals from FIGS. 1 and 2 are used in the description of the system 79. The system 79 may include the shift lever 22 that may be used to control an operating function such as a gear change. The system 79 may also include the brake lever 32 that may be used to control an operating function such as braking. The shift lever 22 may be operatively connected with the variable gear unit 18 through the cable 24. A change in gears may be effected by rotation of the shift lever 22 resulting in translation of the cable 24 being transferred to the variable gear unit 18. The brake lever 32 may be operatively connected with the wheel caliper brake 25 through the cable 36. A braking action may be effected by rotation of the brake lever 32 resulting in translation of the cable 36 being transferred to the brake 25.

The cable movement detector 26 may be associated with the cable 24 such that during a gear shift event, movement of the cable 24, and the direction of movement, may be detected. The amount and direction of movement detected may be communicated from the cable movement detector and may be represented by block 80. A sensor or multiple sensors 82 may be associated with the variable gear unit 18 and/or the motor-generator unit 16. The sensors 82 may be used to determine the current gear at which the system 79 is operating and/or the rotational speed of the motor-generator unit 16. Information about the sensed current gear and speed at the block representing sensors 82 and the cable movement data at block 80 may be communicated to block 84 where the target gear into which the variable gear unit 18 is being shifted may be determined. The current gear may alternatively be determined from the rotational speeds of the motor-generator unit 16, the wheel 15, and the crank 14. The determination may be made through the use of a lookup table.

Information about the target gear from block 84 may be communicated to block 86 where a lookup table may be used to determine the amount of time needed to effect the gear shift from the current gear to the target gear. From the determined gear shift time, the system 79 may proceed to block 87 where a signal 89 may be sent to the motor-generator unit 16 to remove torque from the drivetrain. At block 88, the system 79 may pause the magnitude of the gear shift time determined at block 86. When speed matching is desired, the system 79 may determine the target speed of the motor-generator unit 16 for the target gear at block 90 and may send a signal 91 to the motor-generator unit 16 prior to re-engaging torque. The motor-generator unit 16 may respond to the signal 91 and match the target speed.

With torque removed, the variable gear unit 18 may proceed to the target gear as commanded through the cable 24. When the determined gear shift time has elapsed, the system 79 may proceed to block 92 where a signal 93 may be sent to the motor-generator unit 16 to restore torque, or a proportion of torque based on current conditions. Torque removal for a gear shift may be desirable since torque input from the motor-generator unit 16 may be constant. Torque removal may facilitate shifting such as by unloading an internal gear hub, and may provide for smoother shifting.

The motor-generator unit 16 may be associated with a battery unit 94. During operation of the system 79, when torque input is desired to propel the electric cycle 10, the motor-generator unit 16 may operate as a motor and may draw power from the battery unit 94. When slowing of the electric cycle 10 is desired, the motor-generator unit 16 may operate as a generator and may deliver power through regenerative braking to the battery unit 94 for storage. To optimize regenerative braking, the cable movement detector 38 may be employed.

The cable movement detector 38 may be associated with the cable 36 such that during a braking event, movement of the cable 36 may be detected. The movement detected may be communicated from the cable movement detector 38, and may be represented by block 96. Information about the amount of cable movement at block 96 may be communicated to block 98 where an amount of regenerative braking proportional to the amount of movement of the cable 36 may be determined. A signal 99 representative of the determined amount of regenerative braking may be communicated to the motor-generator unit 16. The motor-generator unit 16 may operate as a generator charging the battery unit 94 and slowing the electric cycle 10. Through use of the cable movement detector 38, regenerative braking may be initiated upon initial movement of the cable 36. Regenerative braking may be proportionally increased as the cable 36 continues to move, and may be decreased as the brake cable 36 is released. Repeated use of the brake caliper 25 may be used to record operational trends in sensed movement to compensate for brake wear and/or stretch of the cable 36.

The following description of variants is only illustrative of components, elements, acts, product and methods considered to be within the scope of the invention and are not in any way intended to limit such scope by what is specifically disclosed or not expressly set forth. The components, elements, products and methods as described herein may be combined and rearranged other than as expressly described herein and still are considered to be within the scope of the invention.

Variation 1 may include a cable movement detector for determining a movement of a cable. A light source may be directed at the cable. A light detector may receive a reflection of the light source from the cable.

Variation 2 may include the cable movement detector according to variation 1 and may include a digital signal processor receiving a signal from the light detector. The digital signal processor may determine a magnitude of the movement from the signal.

Variation 3 may include the cable movement detector according to variation 1 or 2 wherein the cable may have an outer surface with a feature that is sensed by the light detector.

Variation 4 may include the cable movement detector according to any of variations 1 through 3 wherein the light source may be directed at the cable at an angle.

Variation 5 may include the cable movement detector according to any of variations 1 through 4 wherein the cable may pass through the cable movement detector.

Variation 6 may include the cable movement detector according to any of variations 1 through 5 wherein the cable may have a bare segment within the cable movement detector.

Variation 7 may include a product for use with an electric cycle. A cable may be connected in the electric cycle. The cable may control an operating function of the electric cycle. A cable movement detector may be positioned proximate the cable. Movement of the cable may be detected by the cable movement detector, which may generate a signal from the movement. The signal may be used to affect the operating function.

Variation 8 may include the product according to variation 7 wherein the cable movement detector may comprise a light source that is directed at the cable. A light detector may be positioned to receive a reflection of the light source off the cable.

Variation 9 may include the product according to variation 7 or 8 and may include a digital signal processor receiving a signal from the light detector. The digital signal processor may determine a magnitude of the movement from the signal.

Variation 10 may include the product according to any of variations 7 through 9 wherein the cable may have an outer surface with a feature that is sensed by the cable movement detector.

Variation 11 may include the product according to variation 8 or 9 wherein the light source is directed at the cable at an angle.

Variation 12 may include the product according to any of variations 7 through 11 wherein the cable may pass through the cable movement detector.

Variation 13 may include the product according to any of variations 7 through 12 wherein the cable may have a bare segment within the cable movement detector.

Variation 14 may include the product according to any of variations 7 through 13 wherein the operating function may be a gear shift.

Variation 15 may include the product according to variation 14 and may include a motor-generator unit configured to provide a driving torque to the electric cycle. The driving torque may be removed when the cable movement device detects the movement of the cable to shift to a target gear which has a preferred output speed of the motor-generator unit. A speed of the motor-generator unit may be matched to the preferred output speed for the target gear when the driving torque is removed.

Variation 16 may include the product according to any of variations 7 through 15 wherein the operating function may be a braking action.

Variation 17 may include a method of operating an electric cycle that includes a motor-generator unit for propelling the electric cycle, a variable gear unit with a shift lever connected with the variable gear unit through a first cable, and a brake with a brake lever connected with the brake through a second cable. A cable movement detector may be provided in proximity to at least one of the first and second cables. An amount of movement of the at least one of the first and second cables may be determined. The motor-generator unit may be controlled in response to the amount of movement.

Variation 18 may include the method according to variation 17 and may include removing a torque delivered by the motor-generator unit based on the amount of movement. A target speed of the motor-generator unit may be determined, and the motor-generator unit may be controlled to match the target speed.

Variation 19 may include the method according to variation 18 and may include determining a target gear of the variable gear unit based on the amount of movement. An amount of time based on the target gear may be determined. The torque may be removed for the amount of time.

Variation 20 may include the method according to any of variations 17 through 19 and may include the step of applying a regenerative braking action through the motor-generator unit based on the amount of movement.

The above description of select variations within the scope of the invention is merely illustrative in nature and, thus, variations or variants thereof are not to be regarded as a departure from the spirit and scope of the invention.

What is claimed is:

1. A product for use with an electric cycle comprising:
    a cable connected in the electric cycle, the cable controlling an operating function of the electric cycle; and a cable movement detector positioned proximate the cable;
    wherein a movement of the cable is detected by the cable movement detector, wherein the cable movement detector generates a signal from the movement, the signal used to affect the operating function
    wherein the operating function is a gear shift,
    further comprising a motor-generator unit configured to provide a driving torque to the electric cycle, wherein the driving torque is removed when the cable movement detector detects the movement of the cable to shift to a target gear, wherein the target gear has a preferred output speed of the motor-generator unit, and wherein an operating speed of the motor-generator unit is matched to the preferred output speed for the target gear when the driving torque is removed.

2. The product according to claim 1 wherein the cable movement detector comprises a light source that is directed at the cable and a light detector positioned to receive a reflection of the light source off the cable.

3. The product according to claim 2 further comprising a digital signal processor receiving a signal from the light detector, wherein the digital signal processor determines a magnitude of the movement from the signal.

4. The product according to claim 1 wherein the cable has an outer surface with a feature that is sensed by the cable movement detector.

5. The product according to claim 1 wherein the light source is directed at the cable at an angle.

6. The product according to claim 1 wherein the cable passes through the cable movement detector.

7. The product according to claim 1 wherein the cable has a bare segment within the cable movement detector.

8. The product according to claim 1 wherein the operating function is a gear shift.

9. A method of operating an electric cycle that includes a motor-generator unit for propelling the electric cycle, a variable gear unit that has a shift lever connected with the variable gear unit through a first cable, and a brake that has a brake lever connected with the brake through a second cable, the method comprising:
providing a cable movement detector in proximity to at least one of the first and second cables;
determining an amount of movement of the at least one of the first and second cables; and
controlling the motor-generator unit in response to the amount of movement,
further comprising the steps of removing a torque delivered by the motor-generator unit based on the amount of movement, determining a target speed of the motor-generator unit, and controlling the motor-generator unit to match the target speed.

10. The method according to claim 9 further comprising the steps of determining a target gear of the variable gear unit based on the amount of movement; determining an amount of time based on the target gear; and removing the torque for the amount of time.

11. A product for use with an electric cycle comprising:
a cable connected in the electric cycle, the cable controlling an operating function of the electric cycle; and a cable movement detector positioned proximate the cable;
wherein a movement of the cable is detected by the cable movement detector, wherein the cable movement detector generates a signal from the movement, the signal used to affect the operating function,
the cable having a feature comprising a pattern on an outer surface of the cable, and wherein the cable movement detector optically detects movement of the feature; and
further comprising a motor-generator unit configured to provide a driving torque to the electric cycle, wherein the driving torque is removed when the cable movement detector detects the movement of the cable to shift to a target gear, wherein the target gear has a preferred output speed of the motor-generator unit, and wherein an operating speed of the motor-generator unit is matched to the preferred output speed for the target gear when the driving torque is removed.

12. A product as set forth in claim 11 wherein the pattern being printed on the outer surface of the cable.

13. A product as set forth in claim 11 wherein the pattern formed as a result of construction such as by joining a plurality of twisted or braided strands to form the cable.

14. A product as set forth in claim 11 wherein the pattern comprises a randomly textured surface pattern on an outer surface of the cable.

\* \* \* \* \*